US008794183B2

(12) United States Patent
Ahlem et al.

(10) Patent No.: US 8,794,183 B2
(45) Date of Patent: Aug. 5, 2014

(54) MILKING HOSE SUPPORT

(75) Inventors: Mark K. Ahlem, Turlock, CA (US);
Francisco M. Dinis, Hilmar, CA (US);
Michael A. Kindberg, Hilmar, CA (US)

(73) Assignee: CMA Livestock, Hilmar, CA (US)

( * ) Notice: Subject to any disclaimer, the term of this patent is extended or adjusted under 35 U.S.C. 154(b) by 77 days.

(21) Appl. No.: 13/236,539

(22) Filed: Sep. 19, 2011

(65) Prior Publication Data
US 2013/0068166 A1    Mar. 21, 2013

(51) Int. Cl.
*A01J 7/00* (2006.01)

(52) U.S. Cl.
CPC ........................................ *A01J 7/00* (2013.01)
USPC ................... 119/14.1; 119/14.18; 119/14.45

(58) Field of Classification Search
USPC ............ 119/14.54, 14.1, 14.18, 14.37, 14.45; 248/75–81
See application file for complete search history.

(56) References Cited

U.S. PATENT DOCUMENTS

| | | | | |
|---|---|---|---|---|
| 619,517 | A | * | 2/1899 | Trammel ......................... 248/81 |
| 1,855,630 | A | * | 4/1932 | Hempel .......................... 248/81 |
| 2,136,228 | A | * | 11/1938 | Babson et al. ............. 119/14.13 |
| 3,938,470 | A | * | 2/1976 | Pace ............................. 119/14.1 |
| 3,962,575 | A | * | 6/1976 | Vandenberg et al. ......... 248/340 |
| 4,014,128 | A | * | 3/1977 | Hrdlicka ........................ 43/21.2 |
| 4,141,524 | A | * | 2/1979 | Corvese, Jr. ................... 248/70 |
| 4,188,910 | A | * | 2/1980 | Hocker ...................... 119/14.08 |
| 4,228,763 | A | * | 10/1980 | Heidecker et al. ......... 119/14.08 |
| 4,333,421 | A | * | 6/1982 | Schluckbier ............... 119/14.08 |
| 4,491,085 | A | * | 1/1985 | Rubino ........................ 119/14.1 |
| 4,714,219 | A | * | 12/1987 | Mayse ............................ 248/65 |
| 5,054,723 | A | * | 10/1991 | Arnold ............................ 248/65 |
| 5,069,159 | A | * | 12/1991 | Peacock ...................... 119/14.1 |
| 5,765,786 | A | * | 6/1998 | Gretz ........................... 248/68.1 |
| 6,289,845 | B1 | * | 9/2001 | Andersson .................. 119/14.1 |
| 7,891,316 | B1 | | 2/2011 | Maljaars |
| 2004/0040512 | A1 | | 3/2004 | Hayne |
| 2009/0165727 | A1 | | 7/2009 | Petterson et al. |
| 2010/0024734 | A1 | * | 2/2010 | Gingrich et al. ........... 119/14.02 |
| 2011/0114803 | A1 | * | 5/2011 | Lee et al. ........................ 248/70 |

OTHER PUBLICATIONS

Dairy Smarter, The Slender Hose Tree, Parallel Sales Brochure, Jan. 17, 2011, www.dairysmarter.com.
International Search Report and Written Opinion of the International Searching Authority for PCTUS2012055945 mailed Feb. 28, 2013 (12 pages).

* cited by examiner

*Primary Examiner* — Son T Nguyen
(74) *Attorney, Agent, or Firm* — Fitch, Even, Tabin & Flannery LLP (57) ABSTRACT

A milking hose support comprising a frame adapted for supporting a milking hose, the frame having a hose coupler located on a side and adapted for supporting a milking hose; a hinge assembly, wherein the hinge assembly includes a hinge and connects the frame to the hinge; and a first flat bar, wherein the first flat bar is coupled to the hinge assembly, and extends away from the frame, wherein the hinge permits a variable angle of rotation between the frame and the first flat bar.

35 Claims, 5 Drawing Sheets

MILKING HOSE SUPPORT

FIELD OF INVENTION

This invention relates to a milking hose support and more specifically to a milking hose support having a hinge to permit rotation between a floor ("deck") of a milking parlor and a frame of the milking hose support.

BACKGROUND

Dairy farming has been an important aspect of agriculture for thousands of years. Traditionally, dairy animals were hand-milked by a milker ("dairyman") sitting on a stool. Milk was expressed from a dairy animal's teat by the dairyman by squeezing the teat, then moving the hand downward from an udder towards the end of the teat. This action was repeated, using both hands for speed. Milk trapped in a milk duct was squirted out the end of the teat into a bucket supported between the knees of the dairyman. Milking often took place in a field where the dairy animal was tethered to a post, leaving the hind of the animal unrestrained.

An increase in world population has created a demand for more efficient milking methods and has led to the commercialization of dairy farming. There are now fewer, but larger and more efficient dairy farms, operated by fewer workers. Large scale dairy farming methods include milking sheds ("milking parlors") with machines to maximize the output of dairy animals and minimize physical stresses on dairymen and dairy animals. Efficient milking through the use of milking machines often minimizes time a dairy animal spends in a confined stall, and maximizes time spent in a field grazing.

Modern dairy farms include milking parlors, a specialized area on the dairy farm where milking is performed. Milking parlor layouts include rotary, parallel, flat barn and herringbone milking parlors. A rotary milking parlor is a raised rotating platform where the dairy animals stand on the outer edge of the platform. A parallel parlor is a raised milking platform where the dairy animals stand perpendicular to the operator pit and the dairy animals are milked from the rear. A flat barn milking parlor is an area for milking where the dairyman is on the same level as the dairy animal. A herringbone milking parlor is a milking parlor in which dairy animals stand side-by-side, angled towards a pit.

Milking machines are utilized in milking parlors to extract milk. A milking machine applies a continuous vacuum to the teats, causing accumulation of fluids ("congestion") in teat tissues. Air is admitted into a pulsation chamber to allow a liner to collapse around the end of the teat and relieve congestion in the teat tissue, resulting in milking. Four teatcups are attached to the four teats of a dairy animal. Four milk hoses from the teatcups are combined in a milking claw and transported to a bulk tank, in a central milk hose.

It is often difficult to keep a milking claw centered under a dairy animal's udder during milking. Dairy animals often move during milking, making stationary supports for centering milking claws under a dairy animal's udder undesirable, in that a stationary support cannot move with the dairy animal. A stationary milking hose support may also protrude vertically upward into a milking parlor, making it difficult for a dairy animal to enter and exit the milking parlor. A dairyman's tasks may also be impaired by a stationary milking hose support extending vertically upward.

SUMMARY OF THE PRESENT INVENTION

A milking hose support comprising a frame adapted for supporting a milking hose, the frame having hose couplers located on a side and adapted for supporting a milking hose is presented. The milking hose support provides a hinge assembly, wherein the hinge assembly includes a hinge and connects the frame to the hinge, and a first flat bar, wherein the first flat bar is coupled to the hinge assembly, and extends away from the frame. The hinge, in accordance with one embodiment, permits a variable angle of rotation between the frame and the first flat bar. The milking hose support, in some variations, includes a mounting assembly for coupling to the deck of a milking parlor. The mounting assembly, in some variations, comprises a second flat bar for mounting on the deck of the milking parlor, and a flat bar connector for connecting the first flat bar and a second flat bar. The first flat bar, the second flat bar and the flat bar connector may, in some variations, be composed of stainless steel. The mounting assembly is, in some variations, adapted for coupling to a milking parlor such as a rotary milking parlor, parallel milking parlor, flat barn milking parlor, and herringbone milking parlor. In accordance with one variation, the hose coupler is generally cylindrical in configuration. In accordance with one variation, the frame includes a hose coupler on both lateral sides for supporting the milking hose. In accordance with one variation, the frame includes a hose coupler on the left lateral side for supporting the milking hose. In accordance with one variation, the frame includes a hose coupler on the right lateral side for supporting the milking hose. The hinge assembly, in accordance with one embodiment, allows the milking hose support to fall flat onto a deck of a milking parlor when not in use. The hinge assembly, in accordance with one embodiment, allows for an angle of rotation of the frame such that a milking claw is centered under an udder of a cow during milking.

In one embodiment, a frame adapted for supporting a milking hose, the frame having a hose coupler located on a side, and maintained in a generally vertical orientation by engaging a central milk hose extending from a milking claw is presented. The milking hose support provides a hinge assembly, wherein the hinge assembly includes a hinge and connects the frame to the hinge, and a first flat bar, wherein the first flat bar is coupled to the hinge assembly, and extends away from the frame. The hinge, in accordance with one embodiment, permits the frame to fall onto the deck of a milking parlor in a substantially horizontal orientation when the central milk hose extending from the milking claw is removed and disengages from the hose coupler. The milking hose support, in accordance with one embodiment, includes a mounting assembly for coupling to the deck of a milking parlor. The mounting assembly includes, in some variations, a second flat bar for mounting on the deck of the milking parlor and a flat bar connector for connecting the first flat bar and a second flat bar. The first flat bar, the second flat bar and the flat bar connector may, in some variations, be composed of stainless steel. The mounting assembly is, in some variations, adapted for coupling to a milking parlor such as a rotary milking parlor, parallel milking parlor, flat barn milking parlor, and herringbone milking parlor. In accordance with one variation, the hose coupler is generally cylindrical in configuration. In accordance with one variation, the frame includes a hose coupler on both lateral sides for supporting the milking hose. In accordance with one variation, the frame includes a hose coupler on the left lateral side for supporting the milking hose. In accordance with one variation, the frame includes a hose coupler on the right lateral side for supporting the milking hose. The hinge assembly, in accordance with one embodiment, allows the milking hose support to fall flat onto a deck of a milking parlor when not in use. The hinge assembly, in accordance with one embodiment, allows for an angle of rotation of the frame such that a milking claw is centered under an udder of a cow during milking.

DETAILED DESCRIPTION OF THE PREFERRED EMBODIMENTS

There is a need for a milking hose support with a hinge, which provides a variable angle of rotation between a frame for supporting a milking hose and a milking parlor deck so as to center a milking claw under an udder during milking, and automatically fall flat onto a milking parlor deck after a milking claw is removed and milking is completed.

In accordance with some embodiments, a milking hose support having the ability to support a central milking hose extending from a milking claw, so as to center the milking claw under the udder of a dairy animal during milking and move with the dairy animal is provided.

In accordance with some embodiments, a milking hose support having the ability to automatically fall flat onto the deck of a milking parlor in a substantially horizontal orientation when a central milk hose extending from a milking claw is removed and disengages from a hose coupler on a frame of the milking hose support is provided.

In accordance with some embodiments, a milking hose support having the ability to fall flat onto a deck of a milking parlor when not in use is provided.

In accordance with some embodiments, a milking hose support having the ability to be attached to a wide variety of milking parlor decks and to be custom fit to a particular milking parlor deck is provided.

In accordance with some embodiments, a milking hose support having the ability to allow a dairy animal to enter and exit a milking parlor is provided.

In accordance with some embodiments, a milking hose support having the ability to allow a dairyman to carry on milking tasks unimpaired is provided.

Figure 1:
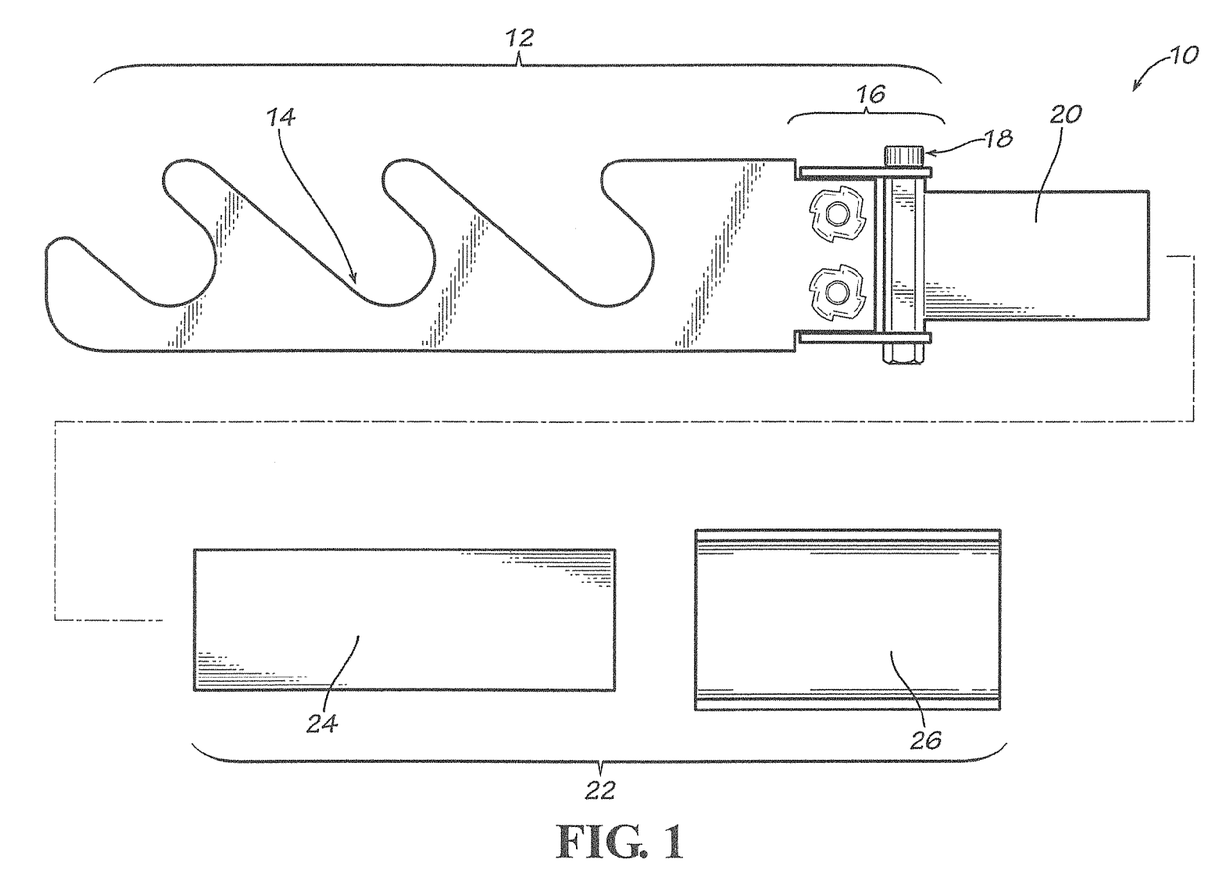
FIG. 1 is a front unassembled elevational view of a milking hose support according to an embodiment of the present invention.

Referring now to FIG. 1, shown is a front unassembled elevational view of a milking hose support 10, including a frame 12 having a hose coupler 14, a hinge assembly 16 having a hinge 18, a first flat bar 20, and a mounting assembly 22 comprising a second flat bar 24 and a flat bar connector 26.

The hinge assembly 16 is attached to the frame 12 and the first flat bar 20. The hinge assembly 16 includes the hinge 18. The frame 12 includes a hose coupler 14. The mounting assembly 22 includes a second flat bar 24 and a flat bar connector 26 having channels for connecting the first flat bar 20 to the second flat bar 24.

In operation, the hose coupler 14 of frame 12 receives a central milking hose extending from a milking claw, the hinge 18 of the hinge assembly 16 allows for an angle of rotation between the frame 12 and the first flat bar 20 mounted to a deck of a milking parlor. The second flat bar 24 and flat bar connector 26 of the mounting assembly 22 allow for mounting onto to various milking parlor configurations. Once assembled, the first flat bar 20 and the second flat bar 24 are mounted to the deck of the milking parlor and are connected by the flat bar connector 26 by sliding the first flat bar 20 and the second flat bar 24 into the channels of the flat bar connector 26.

Figure 2:
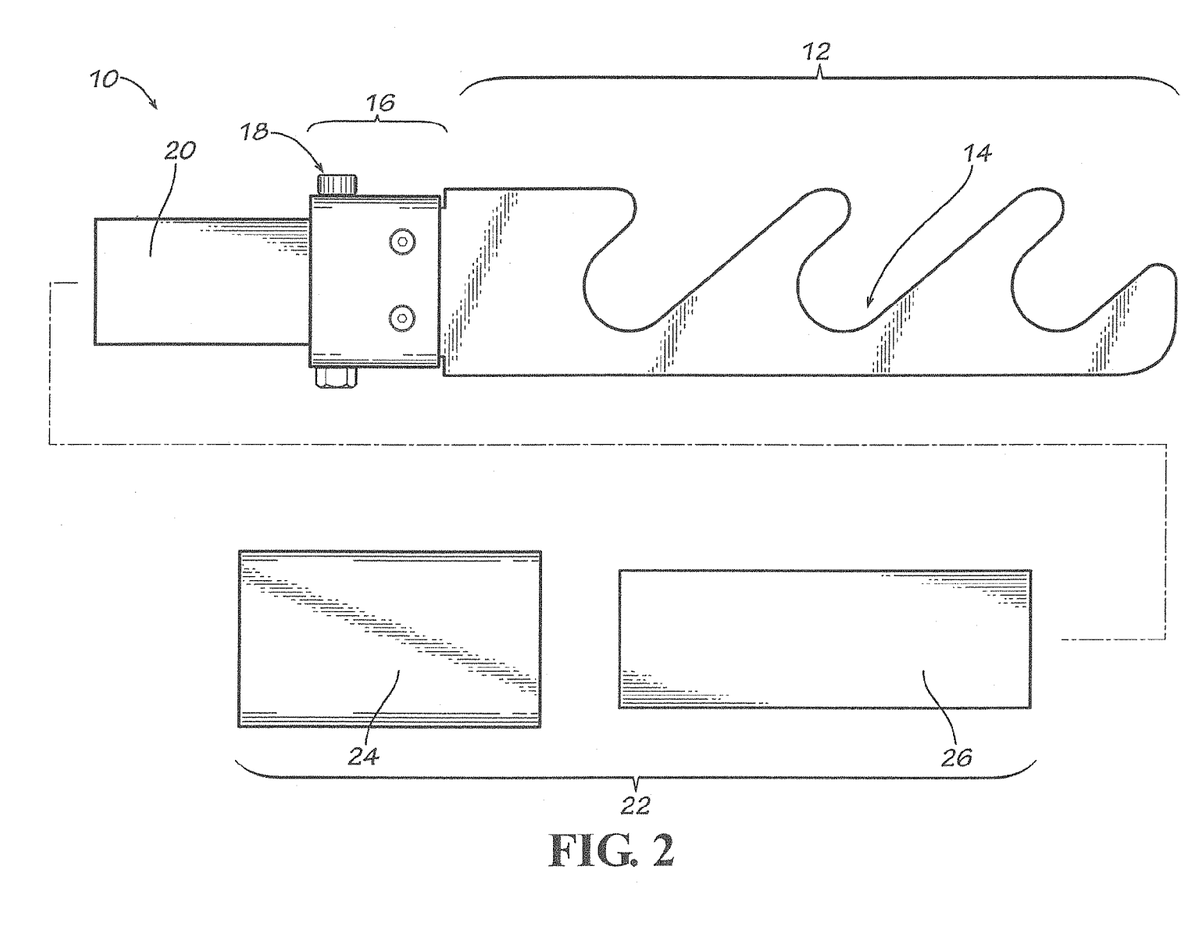
FIG. 2 is a rear unassembled elevational view of the milking hose support of FIG. 1 according to an embodiment of the present invention.

Referring to FIG. 2, shown is a rear unassembled elevational view of the milking hose 10 support of FIG. 1.

Figure 3:
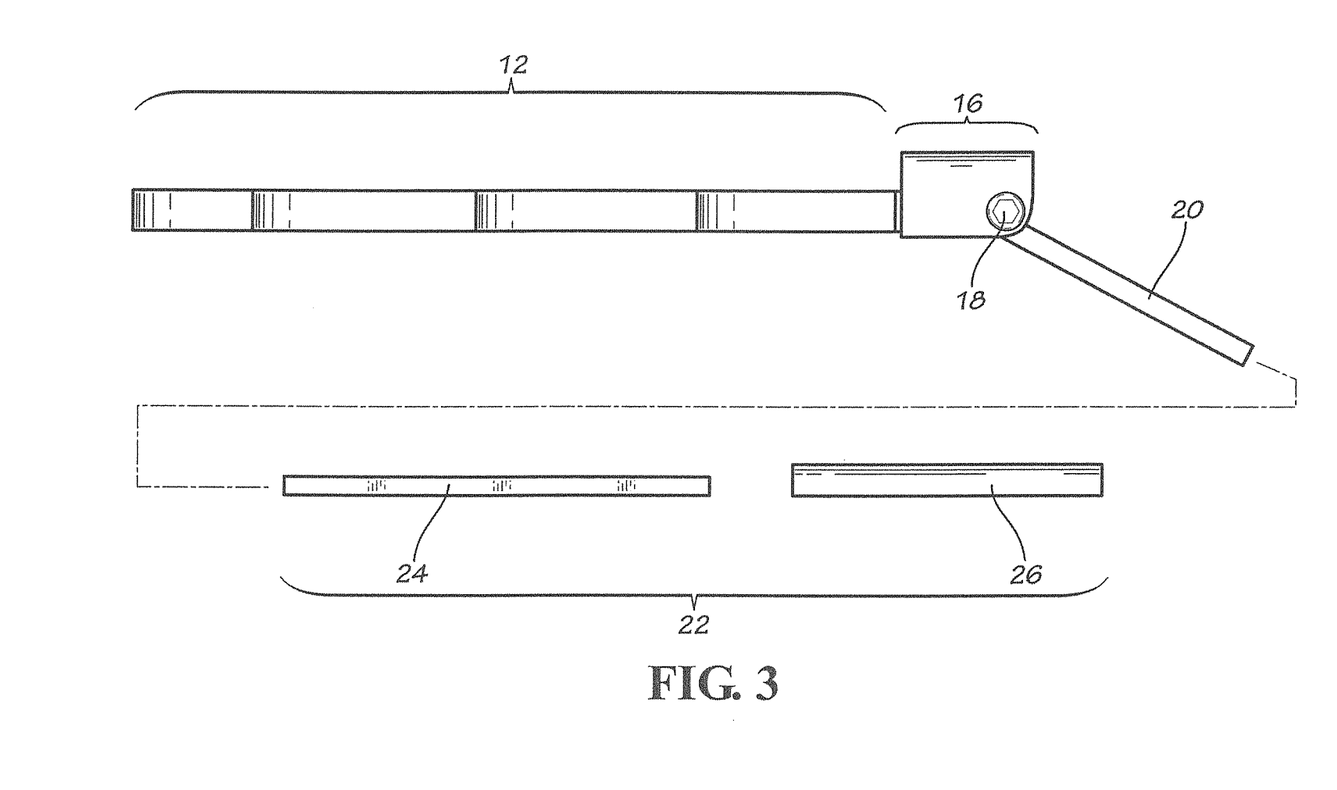
FIG. 3 is a left side elevational view of the milking hose support of FIG. 1 according to an embodiment of the present invention.

Referring to FIG. 3, shown is a left side elevational view of the milking hose support 10 of FIG. 1.

Figure 4:
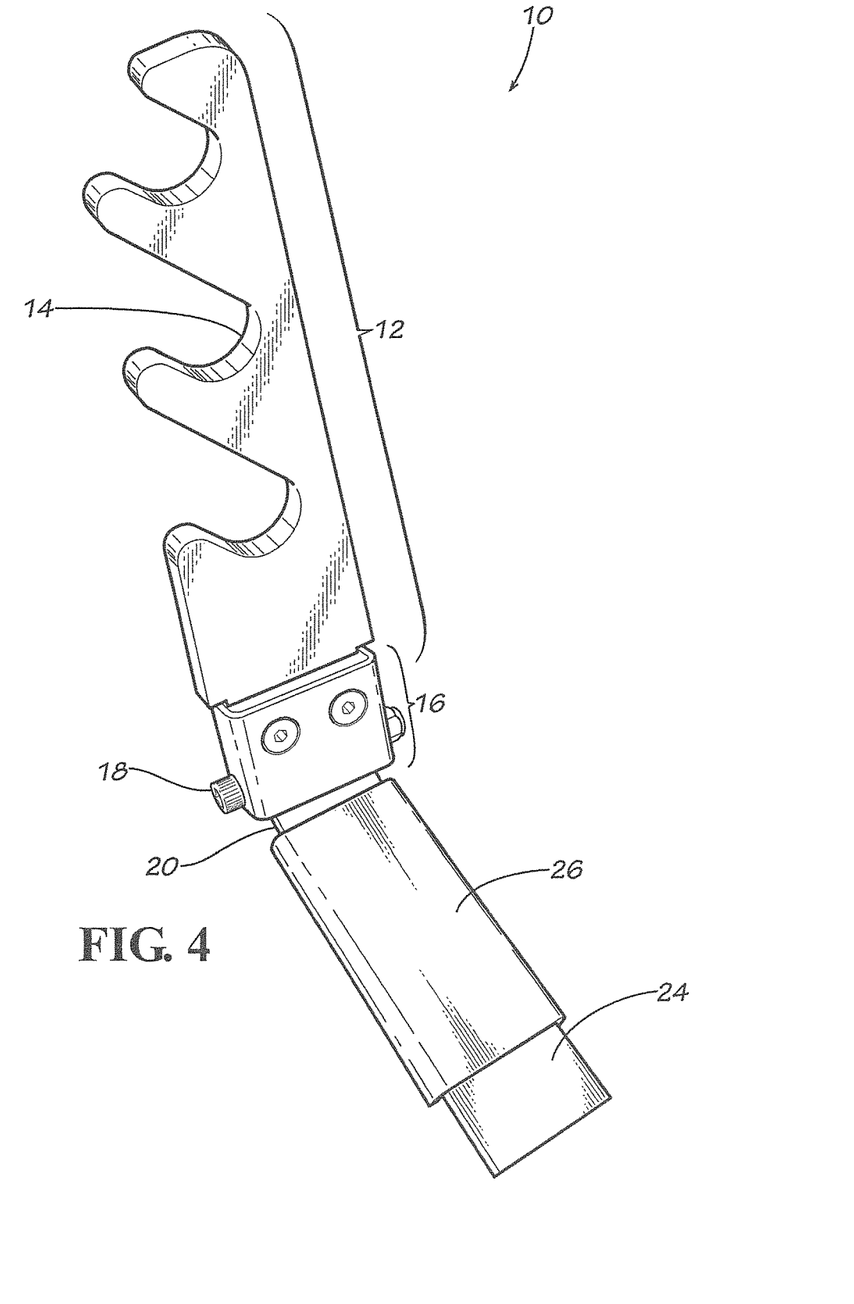
FIG. 4 is an assembled perspective view of the milking hose support of FIG. 1 according to an embodiment of the present invention.

Referring to FIG. 4, shown is an assembled perspective view of the milking hose support 10 of FIG. 1.

Figure 5:
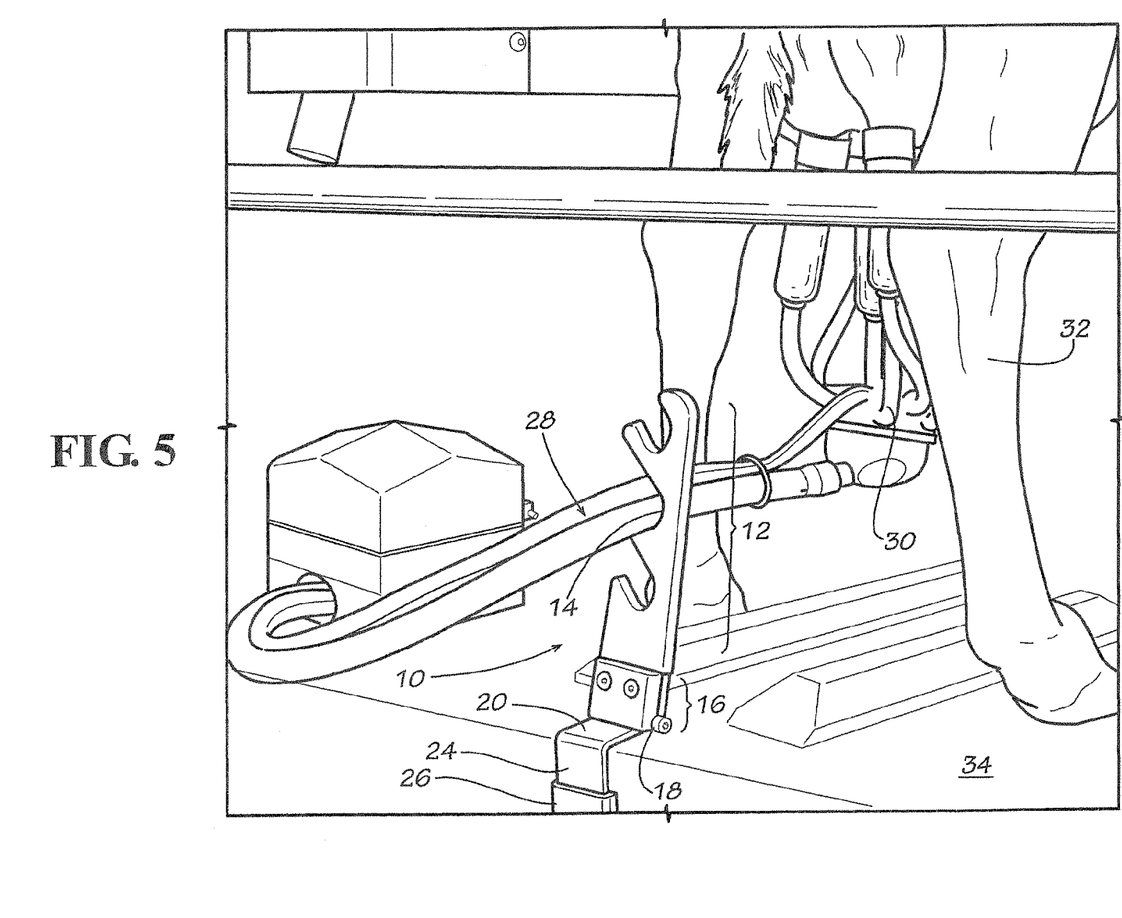
FIG. 5 is an assembled perspective view of the milking hose support of FIG. 1 in use according to an embodiment of the present invention.

Referring to FIG. 5, shown is an assembled perspective view of the milking hose support 10, showing a central milking hose 28, a milking claw 30, a dairy animal 32 and a milking parlor deck 34.

The central milking hose 28 is attached to the milking claw 30, and the milking claw 30 is attached to the dairy animal 32. The hinge assembly 16 is attached to the frame 12 and the first flat bar 20. The hinge assembly 16 includes the hinge 18. The frame 12 includes a hose coupler 14. The mounting assembly 22 includes a second flat bar 24 and a flat bar connector 26 having channels for connecting the first flat bar 20 to the second flat bar 24.

In operation, the hose coupler 14 of the frame 12 of milking hose support 10 receives the central milking hose 28. The central milking hose extends from the milking claw 30 attached to the dairy animal 32. The first flat bar 20 and second flat bar 24 are mounted to the milking parlor deck 34. The hinge assembly 16 permits a variable angle of rotation between the frame 12 and the first flat bar 20, and permits the frame 12 to fall onto the milking parlor deck 34 in a substantially horizontal orientation when the central milking hose 28 extending from the milking claw 30 is removed and disengages from the hose coupler 14.

While the invention has been described in detail with reference to preferred embodiments, it is understood that variations and modifications thereof may be made without departing from the true spirit and scope of the invention.

What is claimed is:

1. A milking hose support comprising:
   a frame supporting a milking hose, the frame comprising a hose coupler on a side supporting the milking hose;
   a hinge assembly, including a hinge, wherein the hinge assembly connects the frame to the hinge; and
   a first flat bar, wherein the first flat bar is coupled to the hinge assembly, and extends away from the hinge assembly,
   wherein the hinge permits a variable angle of rotation between the frame and the first flat bar; and
   wherein the variable angle of rotation between the frame and the first flat bar includes a frame position flat on a deck of a milking parlor;
   wherein the first flat bar is mounted to the deck of the milking parlor; and
   wherein the frame is oriented to fall flat to the deck of the milking parlor when the milking hose is removed from the frame.

2. The milking hose support according to claim 1, further comprising a mounting assembly including means for mounting the first flat bar to the deck of the milking parlor.

3. The milking hose support according to claim 2, wherein the mounting assembly comprises:
a second flat bar, wherein the second flat bar is mounted to the deck of the milking parlor; and
a flat bar connector connecting the first flat bar and the second flat bar.

4. The milking hose support according to claim 3, wherein the first flat bar, the second flat bar and the flat bar connector comprise stainless steel.

5. The milking hose support according to claim 1, wherein the hose coupler is generally cylindrical in configuration.

6. The milking hose support according to claim 1, wherein the frame comprises the hose coupler on a left lateral side for supporting the milking hose.

7. The milking hose support according to claim 1, wherein the frame comprises the hose coupler on a right lateral side for supporting the milking hose.

8. The milking hose support according to claim 1, wherein the hinge assembly allows for an angle of rotation of the frame centering a milking claw under an udder of a dairy animal during milking.

9. The milking hose support according to claim 1, wherein the frame includes a plurality of hose couplers on a side.

10. A milking hose support comprising:
a frame supporting a milking hose, the frame comprising a hose coupler on a side, and maintained in a generally vertical orientation by engaging a milking hose extending from a milking claw, and
oriented to fall flat to a deck of a milking parlor in a substantially horizontal orientation by disengaging the milking hose extending from the milking claw;
a hinge assembly, including a hinge, wherein the hinge assembly connects the frame to the hinge; and
a first flat bar, wherein the first flat bar is coupled to the hinge assembly and extends away from the hinge assembly,
wherein the first flat bar is mounted to the deck of the milking parlor.

11. The milking hose support according to claim 10, further comprising a mounting assembly including means for mounting the first flat bar to the deck of the milking parlor.

12. The milking hose support according to claim 11, wherein the mounting assembly comprises:
a second flat bar wherein the second flat bar is mounted to the deck of the milking parlor; and
a flat bar connector connecting the first flat bar and the second flat bar.

13. The milking hose support according to claim 12, wherein the first flat bar, the second flat bar and the flat bar connector comprise stainless steel.

14. The milking hose support according to claim 10, wherein the hose coupler is generally cylindrical in configuration.

15. The milking hose support according to claim 10, wherein the frame comprises the hose coupler on a left lateral side for supporting the milking hose.

16. The milking hose support according to claim 10, wherein the frame comprises the hose coupler on a right lateral side for supporting the milking hose.

17. The milking hose support according to claim 10, wherein the hinge assembly allows for an angle of rotation of the frame centering the milking claw under an udder of a dairy animal during milking.

18. The milking hose support according to claim 10, wherein the frame includes a plurality of hose couplers on a side.

19. A method of supporting a milking hose comprising:
positioning a frame supporting the milking hose in a generally vertical orientation by engaging the milking hose extending from a milking claw, the frame having a hose coupler on a side;
removing the milking hose extending from the milking claw in response to the milking claw disengaging from a dairy animal; and
disengaging the milking hose from the hose coupler in automatic response to removal of the milking hose, wherein a hinge assembly permits the frame to fall onto a deck of a milking parlor in a substantially horizontal orientation, wherein the hinge assembly includes a hinge and connects the frame to the hinge, wherein a first flat bar is coupled to the hinge assembly and extends away from the hinge assembly.

20. The method of supporting the milking hose according to claim 19, further comprising mounting the first flat bar to the deck of the milking parlor.

21. The method of supporting the milking hose according to claim 20, further comprising:
mounting a second flat bar to the deck of the milking parlor; and
connecting the first flat bar to the second flat bar by means of a flat bar connector.

22. The method of supporting the milking hose according to claim 21, wherein the first flat bar, the second flat bar and the flat bar connector comprise stainless steel.

23. The method of supporting the milking hose according to claim 19, wherein the hose coupler is generally cylindrical in configuration.

24. The method of supporting the milking hose according to claim 19, wherein the frame includes the hose coupler on a left lateral side for supporting the milking hose.

25. The method of supporting the milking hose according to claim 19, wherein the frame includes the hose coupler on a right lateral side for supporting the milking hose.

26. The method of supporting the milking hose according to claim 19, wherein the hinge assembly allows for an angle of rotation of the frame such that the milking claw is centered under an udder of the dairy animal during milking.

27. A method of making a milking hose support comprising:
providing a frame supporting a milking hose, the frame having a hose coupler on a side and supporting the milking hose; and
providing a hinge assembly, wherein the hinge assembly includes a hinge; and
providing a first flat bar; and
coupling the frame to the hinge assembly; and
coupling the first flat bar to the hinge assembly, wherein the first flat bar extends away from the hinge assembly; and
whereby the hinge permits a variable angle of rotation between the frame and the first flat bar mounting the first flat bar to a deck of a milking parlor, wherein the variable angle of rotation between the frame and the first flat bar includes a frame position flat on the deck of the milking parlor.

28. The method of claim 27, further comprising:
providing a mounting assembly, wherein the mounting assembly includes means for mounting the first flat bar to the deck of the milking parlor.

29. The method of claim 28, further comprising:
mounting the first flat bar to the deck of the milking parlor comprising:
mounting the mounting assembly to the deck of the milking parlor; and mounting the first flat bar to the mounting assembly, wherein the variable angle of rotation between the frame and the first flat bar includes a frame position flat on the deck of the milking parlor.

30. The method of claim 28, wherein the providing of the mounting assembly comprises providing the mounting assembly comprising a second flat bar, further comprising:
   mounting the second flat bar to the deck of the milking parlor; and
   connecting the first flat bar and the second flat bar with a flat bar connector.

31. The method of claim 30, wherein the providing of the first flat bar includes providing the first flat bar, wherein the first flat bar includes stainless steel;
   wherein the providing of the mounting assembly comprises:
   providing the mounting assembly comprising the second flat bar, wherein the second flat bar includes stainless steel; and
   providing the mounting assembly comprising the flat bar connector, wherein the flat bar connector includes stainless steel.

32. The method of claim 27, wherein the providing the frame adapted for supporting a milking hose, the frame having the hose coupler on a side and adapted for supporting a milking hose, wherein the hose coupler is generally cylindrical in configuration.

33. The method of claim 27, wherein the providing the frame adapted for supporting a milking hose, the frame having the hose coupler on a side and adapted for supporting a milking hose, wherein the hose coupler is on a right lateral side for supporting the milking hose.

34. The method of claim 27, wherein the providing the frame adapted for supporting a milking hose, the frame having the hose coupler on a side and adapted for supporting a milking hose, wherein the hose coupler is on a left lateral side for supporting the milking hose.

35. The method of claim 27, wherein providing the assembly includes providing the hinge assembly wherein the hinge assembly allows for an angle of rotation of the frame centering a milking claw under an udder of a dairy animal during milking.

* * * * *

UNITED STATES PATENT AND TRADEMARK OFFICE
CERTIFICATE OF CORRECTION

PATENT NO.        : 8,794,183 B2
APPLICATION NO.   : 13/236539
DATED             : August 5, 2014
INVENTOR(S)       : Ahlem et al.

Page 1 of 1

It is certified that error appears in the above-identified patent and that said Letters Patent is hereby corrected as shown below:

In the CLAIMS:
Claim 27, column 6, line 45, after "side" delete "and".

Signed and Sealed this
Seventeenth Day of February, 2015

Michelle K. Lee
*Deputy Director of the United States Patent and Trademark Office*